United States Patent [19]

Martin et al.

[11] Patent Number: 4,649,382

[45] Date of Patent: Mar. 10, 1987

[54] ELECTROCHROMIC DISPLAY EMPLOYING POTENTIOSTATIC ERASURE

[75] Inventors: David H. Martin, Eastleigh; Raymond A. Spanner, Waltham Chase, both of England

[73] Assignee: International Business Machines Corporation, Armonk, N.Y.

[21] Appl. No.: 626,505

[22] Filed: Jun. 29, 1984

[30] Foreign Application Priority Data

Jun. 30, 1983 [EP] European Pat. Off. ........ 83303794.8

[51] Int. Cl.⁴ .............................................. G09G 3/34
[52] U.S. Cl. ..................................... 340/785; 350/357
[58] Field of Search ................ 340/785, 716; 350/363, 350/337; 324/433; 204/5, 194, 400

[56] References Cited

U.S. PATENT DOCUMENTS

| | | | |
|---|---|---|---|
| 3,680,072 | 7/1972 | Charbonnier et al. | 324/433 |
| 3,938,131 | 2/1976 | Van Doorn et al. | 340/785 |
| 4,183,631 | 1/1980 | Kondo et al. | 350/357 |
| 4,255,238 | 3/1981 | Delapierre et al. | 204/5 |
| 4,297,695 | 10/1981 | Marshall | 340/785 |
| 4,306,775 | 12/1981 | Delapierre et al. | 350/363 |
| 4,322,133 | 3/1982 | Uede et al. | 350/357 |
| 4,426,643 | 1/1984 | Martin | 340/713 |

OTHER PUBLICATIONS

Barclay, D. J. et al, "AC Erasure of Electrochromic Displays", IBM Technical Disclosure Bulletin, vol. 20, No. 11A, Apr. 1978.

Primary Examiner—Gerald L. Brigance
Attorney, Agent, or Firm—George E. Clark; Alexander Tognino

[57] ABSTRACT

Completion of potentiostatic erasure of an electrochromic display is detected by monitoring the erase current supplied to addressed display electrodes by potentiostatic erase drive means. The occurrence of a fall in erase current, corresponding to completion of the erasure of the addressed display electrodes, is detected, preferably by a threshold detector, and an erase completion indication produced. This indication effects disconnection of the erase current path.

7 Claims, 4 Drawing Figures

ELECTROCHROMIC DISPLAY EMPLOYING POTENTIOSTATIC ERASURE

TECHNICAL FIELD OF THE INVENTION

The present invention relates to electrochromic displays which are erased potentiostatically.

BACKGROUND OF THE INVENTION

As employed herein the term "electrochromic display" is intended to include all displays in which the passage of an electrolytic current through one or more display electrodes produces a color or contrast change on or at the electrode(s).

One well known type of electrochromic display achieves such an effect by employing an electrochromic substance in solution which is transparent while dissolved but colored when electrodeposited upon an electrode. The colored and transparent states form a redox pair so that the deposited colored material can be electrolytically removed by reversing the current direction. Perhaps the best known electrochromic substance of this type is the 1,1'-di-heptyl-4,4'-bipyridinium dication, which is one of the class of materials known as the viologens. Transparent in solution, it can be reduced electrochemically to the radical cation which is violet colored. In the presence of a suitable anion such as bromide, phosphate or phosphate/hypophosphite mixtures, the colored viologen radical salt precipitates out on the cathode.

The deposition type of display is not the only type of electrochromic display. One other well known type employs a permanent layer of electrochromic material, such as tungsten oxide, on the electrodes. Passage of an appropriate electric charge electrolytically through the electrodes causes a color change in the oxide layer.

In order to control the write and erase operation of both types of displays, it is known to provide in addition to display and counter electrodes, a reference electrode which senses the potential of the solution. Such a reference electrode can be used to control both write and erase operations depending on the particular control scheme selected.

In one known method of controlling a display, selected display electrodes are written to a predetermined contrast by employing a constant current source for a fixed period of time. Under these conditions, a fixed charge is passed and, in a deposition type display, a fixed amount of material is deposited. If the deposit remained absolutely stable upon the display electrodes and conditions remained unchanged, the written display electrodes could be erased by passing an opposite sense constant current for the same period of time. However, many electrochromic deposits slowly redissolve with the consequence that the electrode would be over-erased. The forcing of a constant current after all the electrochromic material had been removed would drive the display electrodes more anodic. Depending on the particular materials employed, this could lead to irreversible electrolytic damage to the display electrodes or to damage by liberation of gases within the cell.

Accordingly, the technique of potentiostatic control of erasure has been employed whereby the potential of the counter electrode is controlled with respect to the solution potential as sensed by a reference electrode in the vicinity of the display electrodes. In the method most commonly employed, the reference electrode potential is compared with a predetermined potential corresponding to substantially complete erasure of the display electrodes and the result of the comparison used to control the potential of the counter electrode. Erase current is thus passed through the cell until the reference electrode potential has dropped to the predetermined level. By allowing a small safety margin, over erasure is prevented. The use of reference electrodes in this way is described in a review article entitled "Electrochromic Display" (New Electronics, Sept. 16, 1975, page 66).

A slightly different form of potentiostatic control of erasure is described in our U.S. Pat. No. 4,426,643. In that patent, one of a pair of reference electrodes is always maintained in a written state, i.e. with a deposit of electrochromic material upon it. This stabilizes its potential with respect to the solution. To erase the display, an offset amplifier is employed to drive the display electrodes to a predetermined potential difference from the coated reference electrode, which corresponds to a state of complete erasure.

To complete the review of the prior art, reference is made to U.S. Pat. Nos. 4,255,038, and to 4,306,775 both of which show a type of electrochromic display in which silver in a black, contrasting form, is deposited onto display electrodes from a solution of a silver halide. The U.S. Pat. No. 4,255,038 states the need for erasure of the written silver image to be terminated at the instant when the counter electrode potential approaches a threshold corresponding to a side reaction. How this is detected is not made clear. Only counter and display electrodes are illustrated and the use of reference electrodes is not shown. However, it is stated that the erase voltage may be controlled by means of a reference electrode as described in U.S. Pat. No. 4,306,775. That application shows the passage of a constant current through a reference electrode in order to "measure the impedance" of the cell. Both erasure and writing of the display are said to be servo-controlled with respect to the measured impedance.

DISCLOSURE OF THE INVENTION

One problem with the use of potentiostatic control of erasure is that the time taken to complete the erase process can vary significantly. This is particularly the case with variable displays which have a plurality of individually addressable display electrodes, different combinations of which are involved in the display of different images. Although all the written electrodes may be written to the same charge density, the total charge to be removed will vary with the written area of display surface. Because the current available for erasure is necessarily limited to a predetermined maximum, the time taken to erase a fully written display will be considerable greater than that needed to erase only a small written area thereof.

From a systems point of view, it is possible to allow all erase operations sufficient time for the most heavily written display to be erased. However, this approach is a significant performance constraint on the speed with which the display can be rewritten.

The present invention depends on the realization that completion of a potentiostatic erase operation can be detected and provides an electrochromic display having a plurality of individually addressable display electrodes, counter electrode means and reference electrode means, all in contact with an electrolyte; addressing means for defining subsets of the display electrodes and providing electrical connections thereto; write drive means, cooperable with the addressing means in response to a write command, to pass current between addressed display electrodes and the counter electrode means so as to write an image or a portion thereof; and potentiostatic erase drive means, cooperable with the addressing means in response to an erase command, to pass erase current between addressed display electrodes and the counter electrode means until the addressed display electrodes reach a predetermined potential with respect to the reference electrode means, so as to erase any image on those electrodes; characterised in that the display further comprises erase completion detection means arranged to monitor the erase current supplied by the potentiostatic erase drive means and to indicate the occurrence of a fall in erase current corresponding to completion of the erasure of the addressed display electrodes.

Thus, completion of erasure can be detected and indicated so that the system can proceed to the next operation. In most applications, considerable quicker display performance is achieved than if a maximum erase time had been allowed for all erase operations. The invention is applicable to any type of electrochromic display including the three discussed above, as part of the prior art.

Preferably, the erase completion detection means comprises a threshold detector for detecting when the erase current has fallen below a predetermined threshold. Clearly, alternative detection techniques could be employed. For example, if the fall in erase current is sharp enough, this could be detected by a differentiator.

The preferred form of threshold detector comprises a constant current sink and a voltage comparator, the erase drive means being connected to supply erase current to the display electrodes via a first resistor and to supply an additional current to the constant current sink via a second resistor, the comparator being arranged to compare the voltages developed across the two resistors.

Although the above arrangement alone would function correctly, the size of the first resistor could impose an undesirable restriction on the total erase current flowing to the display. For this reason, it is preferred that a bypass diode be included in the erase current path in parallel with the first resistor. This means that the threshold voltage, developed across the second resistor must be set below the bypass diode forward voltage.

It is preferred that the display has an erase control means which is responsive to the erase completion indication to disconnect the erase current path to the display electrodes. Such disconnection could, in theory, be immediate but, in practice, it is preferred to include a delay device between the erase completion detection means and the erase control means. This delays disconnection of the erase current path for an additional predetermined time. Such additional erase time is desirable to allow traces of electrochromic deposit, which may be present in a less easily reversible form than the bulk of the deposit, to be removed. Otherwise such deposits have been found to accumulate gradually causing eventual deterioration of the display.

The invention is particularly useful in displays of the matrix type in which the addressing means is capable of defining orthogonal blocks of display electrodes as subsets for erasure. In such displays, for example, the block to be erased may be anything from a single pel to a character block, having of the order of 100 picture elements (i.e. display electrodes), to a full screen image having the order of 10,000 elements. However, the invention is not restricted to use in such displays and may also be of use in, for example, digital displays formed of different character segments.

The invention will now be described further, by way of example only, with reference to the following drawings.

DETAILED DESCRIPTION OF THE DRAWINGS

Figure 1:
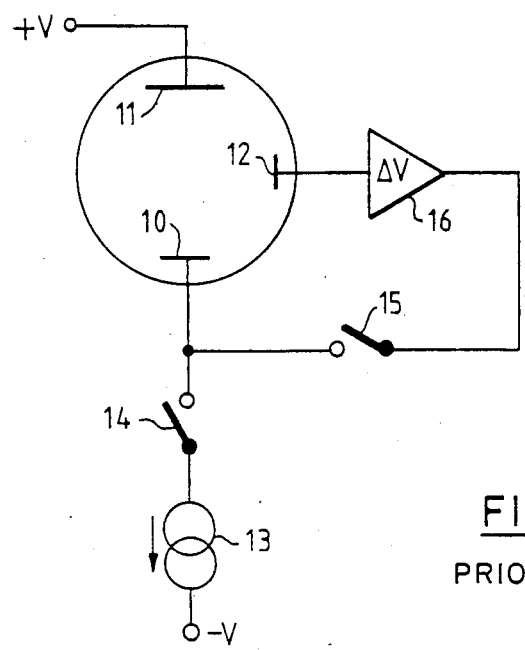
FIG. 1 shows schematically a known prior art circuit arrangement for constant current writing and potentiostatic erasure of an electrochromic display cell.

Before describing the detailed arrangement of a preferred example of an electrochromic display according to the invention, the basic principles of writing and erasing such displays will first be discussed in connection with FIGS. 1 and 2. The cell schematically illustrated in FIG. 1 contains a solution of an electrochromic substance such as viologen, a preferred form being a mixture of 1,1' di-heptyl-4,4' bipyridinium phosphate and hypophosphite as described in U.S. Pat. No. 4,187,003.

Within the cell are shown three electrodes, a display electrode 10, a counter electrode 11 and a reference electrode 12. In practice, the display electrode 10 is one of a number of display electrodes which are selected as picture elements (pels) in accordance with the information to be displayed. However, only one such electrode is shown for ease of explanation. A preferred form of display electrode for a viologen electrochromic system is a rough plated silver electrode. The rough silver acts as a diffuser of light and has a matt white appearance when unwritten. The rough surface also has electrochemical advantages as explained in U.S Pat. No. 4,252,418. The preferred counter electrode for this type of system is a platinum black plated foil at one side of the display cell.

The reference electrode 12 is an electrical conductor which is assumed to have a stable potential with respect to the solution. Preferably the reference electrode will be of the same material as the display electrodes, in this case silver.

The contrast achievable with such a display is proportional to the electric charge passed. To ensure uniformity of color a constant current writing method is employed. Thus to write display electrode 10, the counter electrode 11 is connected to a source of potential $+V$ and a constant current source 13 is connected to the floating display electrode 10 via switch 14 for a predetermined time period. The passage of a predetermined amount of charge results in the reduction of a corresponding amount of viologen to its colored radical cation state at the electrode 10. The reduced radical cation combines with the anions in the solution and precipitates on the display electrode. For an adequate contrast, with the viologen system described, a charge of about 2 mC cm$^{-2}$ is needed. The reference electrode plays no part in the write operation and is disconnected by a switch 15.

Figure 2:
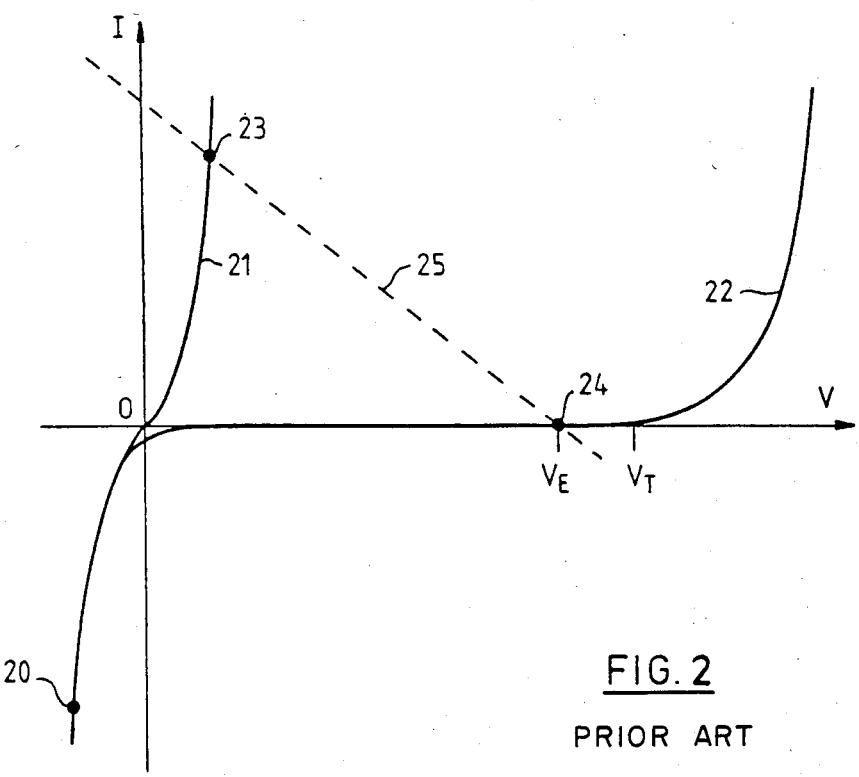
FIG. 2 shows the variation of voltage in the prior art cell of FIG. 1 under different display conditions.

With reference to FIG. 2, conditions at the display electrode during the write process are represented by a point 20 on the common portions of two curves 21 and 22 in the lower left hand quadrant. The potential of the display electrode is essentially determined by the value chosen for the constant current from source 13. When the write step has finished and the current source 13 is disconnected, the potential of the display electrode will rise to a rest potential arbitrarily shown as zero on the curve. This is the potential of a disconnected viologen coated silver electrode in a viologen solution. An electrode so written will remain coated with viologen for some time in the absence of an externally applied potential. This is the so called "memory" effect of this type of electrochromic display.

Considering now the erase process, the upper portion of curve 21 (FIG. 2) shows the variation of current through a cell such as that of FIG. 1 for a written display electrode which is being driven anodic. As long as the electrode remains coated with viologen, the erase current rises exponentially in similar fashion to the write process. The curve 21 corresponds to the oxidation of viologen radical cation back to the di-cation which redissolves in the solution. This process is terminated by the removal of all the viologen from the electrode.

By way of comparison, if an unwritten electrode is driven anodic, curve 22 shows that no significant current flows until a potential $V_T$ is exceeded after which current increases rapidly. This increase in current corresponds to unwanted side reactions of the display electrode. In the case of a viologen on silver system, $V_T$ is about 550 mV and the side reaction is the irreversible anodization of the silver to a black form. If the erase process is controlled potentiostatically the display electrode potential can be limited to a value $V_E$ which, while corresponding to complete erasure, stops short of the side reaction threshold $V_T$.

Potentiostatic erasure is effected in the cell of FIG. 1 by closing a switch 15 to connect the output of an offset buffer 16, which is a high input impedance amplifier, to the electrode 10. The input to the amplifier 16 is the solution potential sensed by the reference electrode 12. The offset $\Delta V$ of the amplifier is made equal to the potential difference $V_E$. Without drawing current from the reference electrode, the amplifier 16 supplies erase current to display electrode 10 until its potential reaches the output potential $V_{ERASE}$ of the offset amplifier which is $V_E$ with respect to the reference electrode.

Initially the current is high, as shown at point 23 of curve 21 and remains at this level until the viologen is almost removed. The difference between the potential of the electrode 10 at point 23 and the target erase potential $V_E$ is accounted for by the I.R. drop in the cell. Point 23 and a point 24 corresponding to complete erasure lie on a load line 25 which the potential of electrode 10 follows as the last viologen is removed and the current in the cell falls.

Figure 3:
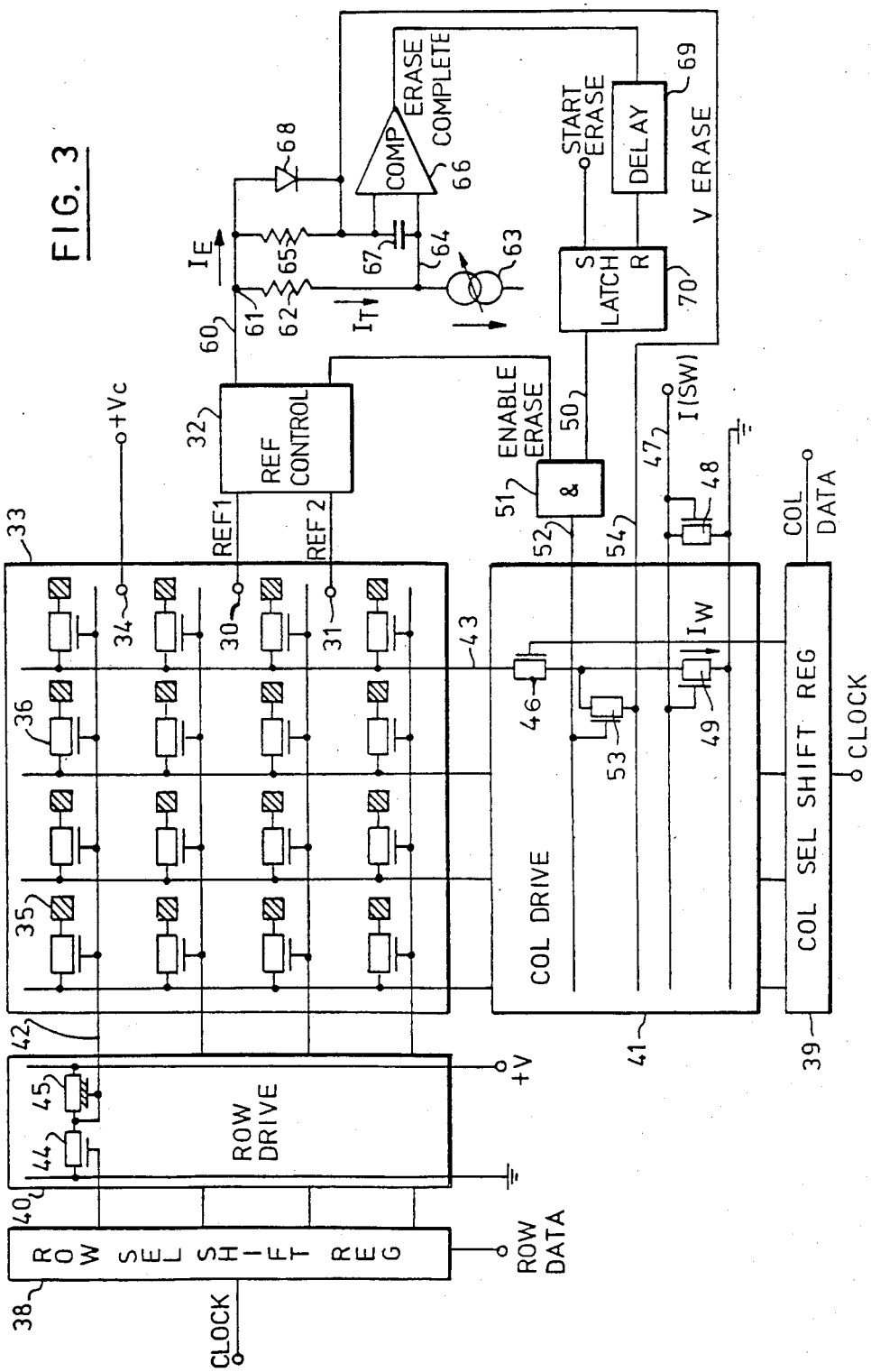
FIG. 3 shows an electrochromic display according to the present invention which also employs constant current writing and potentiostatic erasure.

In FIG. 3, there is shown an electrochromic display according to the present invention. The display operates according to the basic principles of FIGS. 1 and 2, but is provided with dual reference electrodes 30 and 31. These electrodes alternately cycle between "reference" and "refresh" modes under control of a reference control circuit 32. The control circuit 32 ensures that one of these two electrodes is always in the reference mode in which it is coated with sufficient viologen to stabilize its potential with respect to the solution as described in the above referenced U.S. Pat. No. 4,426,643. While one of the electrodes 30 and 31 is in the reference mode the other is being erased and rewritten. The erasure of the electrode to be refreshed is desirable so that the amount of viologen subsequently rewritten can be accurately controlled. The detailed operation of the reference control circuit 32 is not relevant to the present invention but is described in the referenced U.S Pat. No. 4,426,643.

The display of FIG. 3 comprises a sealed cell 33 containing an aqueous solution of a mixture of 1,1' diheptyl-4,4' bipyridinium phosphate and hypophosphite. Within the cell, in addition to the reference electrodes 30 and 31, is a platinum black counter electrode 34, connected to a source of potential $V_c$, and an array of identical matt silver display electrodes 35, each constituting one picture element or "pel". For ease of illustration only sixteen pels are shown, arranged in a four by four array. In practice a much larger number would be employed.

The pels 35 are formed over a corresponding array of field effect transistors 36 and each pel is electrically connected to the drain of an associated FET 36 by via metallurgy. The FET's are themselves formed on a silicon substrate and overlaid with inorganic and organic passivation layers.

The write and erase operations of the display cell 33 are controlled by associated display drive circuits in response to externally supplied control signals. The write operation is a constant current process and the erase operation is potentiostatic, as shown in principle in FIGS. 1 and 2, but with the difference that a large number of display electrodes are involved.

Each of the pels 35 may be individually selected for writing by means of its associated FET 36 which behaves as a switch. The individual pels are identified by means of row and column data loaded into shift registers 38 and 39. The row and column shift registers control associated row and column drivers 40 and 41 which activate selected row and column lines 42 and 43 to the gates and sources respectively of the FET matrix. Thus if a row line 42 is activated, that row of FET's connect the pels 35 of the row to any write or erase currents flowing on column lines 43.

The row drive circuit 40 comprises a string of transistor pairs, such as enhancement mode device 44 and depletion mode device 45, each associated with one stage of the shift register 38. These two devices form a line driving inverter which isolates the shift register circuit from the loading of the row select line.

The column driver 41 is slightly more complicated in that it has to provide both erase and write current to the lines 43. Selection of a line 43 for either operation is by means of a transistor switch 46 in accordance with the contents of an associated shift register stage.

The write operation is selected by switching a reference current $I_{(SW)}$ to the write line 47. Transistor 48 controls the gate voltage of a number of coupled transistors 49 such that they act as current sources of magnitude equal to the reference current, one for each column, equivalent to the sources 13 of FIG. 1. Thus, if a selection transistor 46 is on, a constant current, $I_w$, will be drawn from the associated column line 43. The writing process is such that the display is written one row at a time so that only a single FET 36 in any column can be on at any given time.

The potentiostatic erase process is also controlled by the row and column drivers and can be a block operation. In other words all pels, both written and unwritten, in an area to be erased are selected by loading the row select and column select shift registers 38 and 39 with the appropriate data pattern. The erase operation is selected by the application of an externally generated START ERASE signal, e.g. from a microprocessor, to a latch 70. The "set" output of the latch is applied on line 50 to an AND gate 51. If an ENABLE ERASE signal has been generated by control circuit 32 AND gate 51 raises a line 52 to switch on a string of transistors 53. These transistors, when switched on, connect the potentiostatic erase voltage $V_{ERASE}$ applied on a line 54 to all the selected column lines 43 via transistors 46. The potentiostatic erase voltage is generated from the solution potential sensed by reference electrodes 30 and 31 by an offset amplifier in reference control circuit 32 similar to amplifier 16 of FIG. 1. Because the potentiostatic erase process is self limiting, no damage results from the selection and connection of unwritten as well as written pels to the erase potential.

Figure 4:
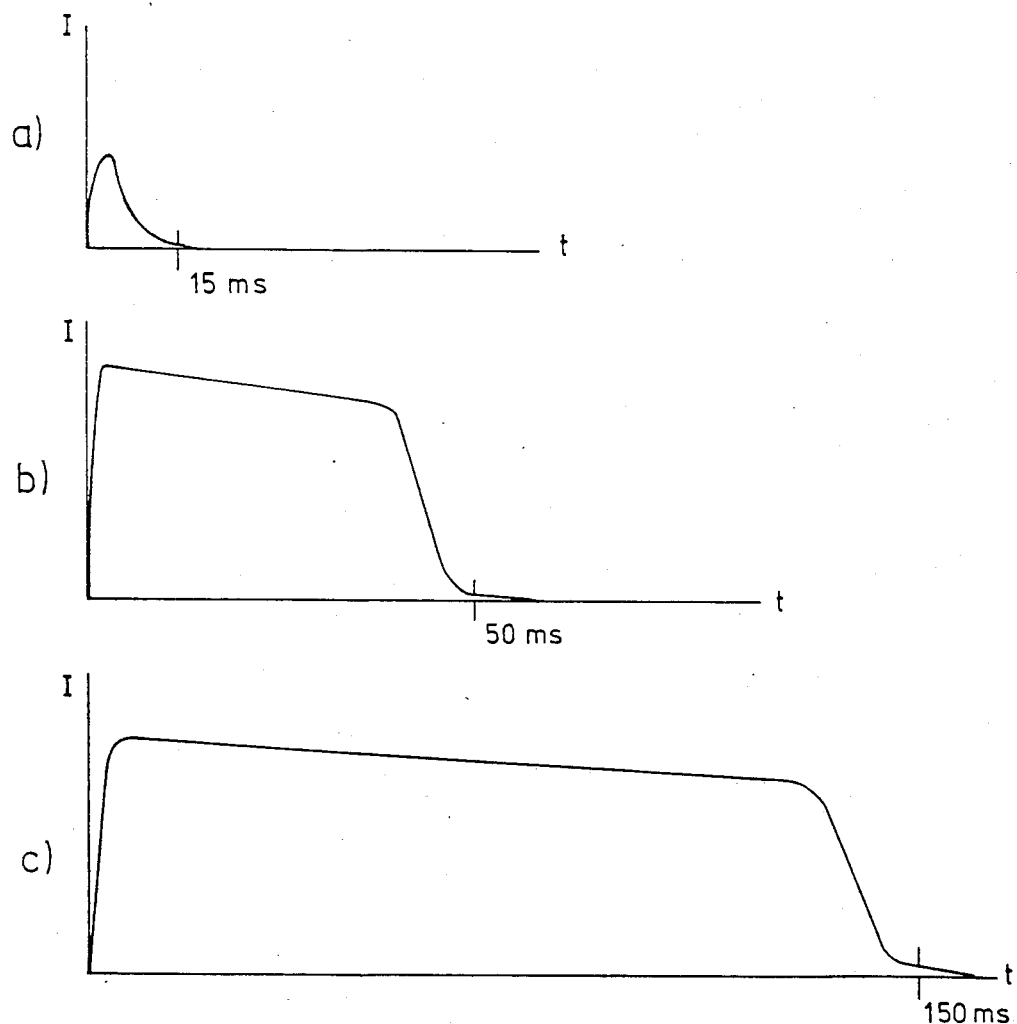
FIG. 4 shows the variation in total erase current for different written states of the display of FIG. 3.

The duration of the potentiostatic erasure operation varies significantly depending upon the area of display to be erased and the proportion of written electrodes within that area. Typical examples of the variation with time of the total erase current on line 54 are shown in FIG. 4. Waveform (a) shows the current flow during erasure of a small number of pels (of the order of 100). In this case erasure is completed in 15 mS. Waveform (b) shows the current flow during a partial screen erase (typically 1000 pels). Waveform (c) shows the typical current flow during a full screen erase (approximately 10,000 pels). It will be observed that completion of erasure is characterised by a rapid fall to zero current from an approximately constant current state. This fall which corresponds to the collapse of current down the load line 25 of FIG. 2, is detected by the circuitry of FIG. 3 as will now be explained.

The reference control circuit 32, as previously indicated, includes an offset amplifer, equivalent to amplifier 16 of FIG. 1, whose output is produced on line 60. The amplifier behaves as a voltage source and provides whatever current is necessary to maintain line 60 at the fixed potential offset, $V_{ERASE}$, from the operative reference electrode.

This current has two components $I_E$ and $I_T$ which divide at junction 61. $I_E$ is the erase current ultimately flowing to the selected electrodes 35 via line 54. $I_T$ is a constant current supplied, via resistor 62 to a current sink 63. The current sink 63 is variable and defines, by means of the I.R drop across resistor 62, a threshold voltage on line 64.

The erase current $I_E$ also produces an I.R potential drop across resistor 65 which is compared with the threshold voltage in comparator 66. The difference between the two voltages is smoothed by capacitor 67 to prevent the comparator output being sensitive to transients.

A bypass diode 68 in the erase current path carries the bulk of the erase current so that the erase process is not slowed down by the relatively high resistance of resistor 65. Because of the presence of the bypass diode 68, the threshold voltage set by current sink 63 and resistor 62 must be below the forward diode drop voltage of diode 68.

When the erase current, $I_E$, falls below the reference current, $I_T$, the comparator 66 will produce an output signal, "ERASE COMPLETE", indicating the completion of the erase process by comparing the associated erase voltage from said erase current to a predetermined voltage threshold. This signal is applied via a delay element 69 to the reset input of latch 70 which was previously set in response to receipt of the command "START ERASE" from an external control device, such as a microprocessor. In fact, the functions of the delay 69 and latch 70 may, most conveniently, be implemented in such a microprocessor. The additional delay is desirable to make sure that traces of deposit which are in a near irreversible state (e.g. the doubly reduced viologen cation) are also erased. The fall in erase current shown in FIG. 4 only relates to the oxidation of the singly reduced radical cation, in the case of viologen. A typical additional delay for the display of FIG. 3 would be around 20 mS.

The reset state of latch 70 is finally applied on line 50 to the lower input of AND gate 51. This AND gate was enabled, during the erase operation, to gate "on" the transistors 53 and permit flow of erase current via transistors 46. The resetting of latch 70 now inhibits the AND gate 51 and terminates the erase operation by turning off transistors 53 to disconnect the erase current from the column lines 43. The display is now ready to proceed to the next operation.

It has been found, in practice, with the display of FIG. 3, that full screen erase times are reduced by an order of magnitude, as compared with the theoretical maximum time needed to erase a full screen with every pel written.

We claim:

1. In an electrochromic display having a plurality of individually addressable display electrodes, counter electrode means and reference electrode means, all in contact with an electrolyte; addressing means for defining subsets of the display electrodes and providing electrical connections thereto;

write drive means, cooperable with the addressing means in response to a write command, to pass current between addressed display electrodes and the counter electrode means so as to write an image or a portion thereof;

and potentiostatic erase drive means, cooperable with the addressing means in response to an erase command, to pass erase current between addressed display electrodes and the counter electrode means until the addressed display electrodes reach a predetermined potential with respect to the reference electrode means so as to erase any image on those electrodes, the improvement to said display comprising:

erase completion detection means arranged to monitor said erase current supplied by said potentiostatic erase drive means and to terminate said erasure operation on the occurrence of a fall in erase current corresponding to completion of the erasure of the addressed display electrodes.

2. A display claimed in claim 1 in which the erase completion detection means comprises a threshold detector for detecting when the erase current has fallen below a predetermined threshold by comparing the voltage associated with said erase current to a threshold voltage associated with a component of the current from the potentiostatic erase drive means.

3. A display as claimed in claim 2 in which the threshold detector comprises more than one current path such that one of said paths supplies (a) the erase current to the display electrodes via a first resistor and (b) the voltage associated with said erase current to a voltage comparator and the other of said paths supplies (c) an additional current component to a constant current sink via a second resistor and which voltage associated with said additional current is supplied to the same said comparator said comparator being arranged to compare the voltages developed across the two resistors.

4. A display as claimed in claim 3 including a bypass diode in the erase current path in parallel with the first resistor.

5. A display as claimed in any preceding claim including erase control means responsive to the erase completion detection means such that the erase current path is disconnected to the display electrodes on the occurrence of a fall in erase current.

6. A display as claimed in claim 5 including a delay device between the erase completion detection means and the erase control means for delaying disconnection of the erase current path for an additional predetermined time.

7. A display as claimed in any preceding claim in which the display is a matrix display, with addressing means for defining orthogonal blocks of display electrodes as subsets for erasure.

* * * * *